United States Patent [19]

Petrille, III et al.

[11] Patent Number: 5,632,899
[45] Date of Patent: May 27, 1997

[54] DETOXIFICATION OF ALKYLTHIOALKYLAMINES WITH SWELLING TYPE NATURAL OR SYNTHETIC CLAYS

[75] Inventors: Joseph C. Petrille, III, North Wales; Michael W. Werner, Warrington; Wilson K. Whitekettle, Jamison, all of Pa.

[73] Assignee: BetzDearborn Inc., Trevose, Pa.

[21] Appl. No.: 504,636

[22] Filed: Jul. 20, 1995

[51] Int. Cl.$^6$ ........................................ C02F 1/28
[52] U.S. Cl. .................. 210/691; 210/764; 210/908; 210/910
[58] Field of Search ........................ 210/691, 764, 210/910, 749, 908

[56] References Cited

U.S. PATENT DOCUMENTS

| | | |
|---|---|---|
| 3,524,812 | 8/1970 | Shuma et al. ........................ 210/63 |
| 4,011,175 | 3/1977 | Preus .................................... 252/427 |
| 4,204,954 | 5/1980 | Jacob .................................... 210/59 |
| 4,970,239 | 11/1990 | Whitekettle et al. ................ 514/665 |
| 5,030,358 | 7/1991 | Cooper et al. ...................... 210/670 |
| 5,071,587 | 12/1991 | Perman ................................ 252/181 |
| 5,169,536 | 12/1992 | Vasconcellos et al. ............ 210/391 |

OTHER PUBLICATIONS

Hawley's Chemical Dictionary, 12$^{th}$Ed., Van Nostrand Reinhold Company, New York, 1993, p. 127.

*Primary Examiner*—Cynthia L. Nessler
*Attorney, Agent, or Firm*—Alexander D. Ricci; Steven D. Boyd

[57] ABSTRACT

The present invention is directed to methods of detoxifying water containing alkylthioalkylamine compounds. The methods comprise adding to an aqueous system containing alkylthioalkylamines, a sufficient quantity of a swelling type natural or synthetic clay to neutralize the toxicity associated with alkylthioalkylamines to aquatic organisms.

4 Claims, No Drawings

DETOXIFICATION OF ALKYLTHIOALKYLAMINES WITH SWELLING TYPE NATURAL OR SYNTHETIC CLAYS

FIELD OF THE INVENTION

The present invention relates to the detoxification of alkylthioalkylamines with regards to aquatic organisms. More particularly, the present invention relates to a process which employs swelling type clays to reduce the toxicity of alkylthioalkylamines sufficiently to protect aquatic organisms.

BACKGROUND OF THE INVENTION

Alkylthioalkylamines represent an important class of cationic surface active agents which are used in a variety of commercial products. Alkylthioalkylamines are exemplified by the structure:

$$CH_3(CH_2)_n-S-(CH_2)_m-NH_2$$

wherein n is an integer of from 4 to 17, preferably 6 to 12 and most preferably 9, and m is an integer of from 2 to 3, preferably 2. The acid addition salts of alkylthioalkylamines may also be detoxified by the present invention. A common alkylthioalkylamine is decylthioethylamine (DTEA) available from the Dow Chemical Company under the name DTEA.

Alkylthioalkylamines are utilized for a variety of commercial applications as diverse as chemical and pharmaceutical intermediates, dispersing agents, and flotation promoters as well as biocides for the treatment of aqueous systems. Aqueous systems are exemplified by once-through and recirculating cooling water systems in industrial facilities, papermaking process water, municipal water/wastewater systems, service water systems, fire protection systems, ship ballast water and cooling reservoirs. A major concern with the use of alkylthioalkylamines in aqueous systems is their release and environmental impact to aquatic ecosystems and wastewater treatment facilities. Alkylthioalkylamines are toxic to aquatic life including bacteria, algae, macroinvertebrates and fish. These compounds, if discharged in excess, could upset wastewater treatment processes. Releasing residual amounts of these compounds may cause unacceptable short term or long term impact to aquatic life within the receiving system. Aquatic life referred to herein includes microbiological organisms (i.e., bacteria, fungi, and algae), fish, plankton and benthic macroinvertebrates and zooplankton assemblages living within streams, rivers, lakes, reservoirs, estuaries and oceans.

Concerns with respect to such discharge of alkylthioalkylamines and other toxic waste products into the aquatic environment has grown significantly in recent years. This growing concern is manifested, in part, in the actions of municipal, state and federal environmental regulatory authorities who have either already enacted legislation to eliminate the pollution of our natural water or who are in the process of promulgating such regulations. The regulations and legislation enacted by such authorities are becoming more and more stringent with the ultimate goal being the prohibition of the addition of any chemical compound into the aquatic environment which has even an insignificant effect on the aquatic life which exists therein.

In response to such legislation, industrial users of large volumes of water have sought out methods of decreasing effluent toxicity. For example, U.S. Pat. No. 3,524,812 teaches a method of decreasing the biocidal effects of bromonitrostyrene by reaction with a compound selected from a water soluble sulfite compound, hydrogen peroxide, and potassium permanganate. U.S. Pat. No. 4,204,954 teaches the use of anionic substances such as sodium stearate, sodium dodecylsulfate, dodecylglycine, dodecylaminoethylglycine, sodium palmitate, sodium oleate, sodium linolate, and sodium dioctylsulfosuccinate to detoxify quaternary ammonium based biocides. U.S. Pat. No. 5,030,358 discloses the deactivation of organophosphorous biocides in systems which also contain dissolved oxygen by adding a catalytic amount of activated carbon. U.S. Pat. No. 5,169,536 teaches a method of detoxifying cationic surfactant based biocides, such as quaternary ammonium based biocides, with a combination of bentonite clay detoxification agent and a polymerized alkylnaphthalene sulfonate sodium salt dispersing agent.

SUMMARY OF THE INVENTION

The present inventors have discovered that swelling type natural and synthetic clay materials can neutralize the toxicity associated with alkylthioalkylamines towards aquatic organisms. The swelling type natural and synthetic clay materials are effective while non-swelling type natural and synthetic clay materials are not effective. The detoxifying activity of swelling type natural and synthetic clay materials is realized by adding the clays directly to the water containing alkylthioalkylamines as either a dried powder or as a colloidal suspension.

DESCRIPTION OF THE PREFERRED EMBODIMENT

The present inventors found that swelling type clay materials (used herein to refer to both natural and synthetic materials) are effective at neutralizing the toxicity of alkylthioalkylamines towards aquatic organisms. The detoxifying ability of swelling type clay materials was evaluated in numerous acute bioassays conducted in accordance with U.S. E.P.A. guidelines. Aquatic toxicity test procedures using the water flea, *Daphnia magna*, as a representative aquatic organism were performed to assess the ability of swelling type clay materials to detoxify alkylthioalkylamines. *Daphnia magna* were chosen as a representative species due to their extreme sensitivity to alkylthioalkylamines in comparison to other aquatic organisms.

Swelling type clays, including but not limited to swelling types of smectite clays and similar synthetic layered silicate clays, were found to effectively neutralize the toxicity of alkylthioalkylamines toward aquatic organisms. The swelling type clays can be added directly to water containing alkylthioalkylamines either as dried powder or as a colloidal suspension. The alkylthioalkylamines are strongly absorbed to the external and interlameller surfaces of these materials. It is important to note that layered clay materials which are non-swelling such as kaolinites, illites and attapulgite and some types of calcium montmorillonites do not readily absorb and neutralize the toxicity of alkylthioalkylamines.

Generally, swelling clays are in the smectic group including clay minerals such as montmorillonite, beidellite, nontronite, saponite, hectorite and sauconite. Of these, montmorillonite is the clay mineral found most commonly in formation core analysis. Montmorillonite is commonly associated with clay minerals known as mixed-layer clays.

Smectite mineral clays are classified by their chemical composition and crystalline structure. Smectite clay materials are also classified by the species and location of cations in the tetrahedral and octahedral sheets. Smectite mineral clays consist of two structural groups classified as dioctahedral or trioctahedral. When two thirds of the octrahedral sites are occupied primarily by trivalent cations, the structures are classified as dioctahedral, but when all octahedral sites are occupied by divalent cations, the structures are classified as trioctahedral. Smectite clays representative of these two groups of materials include the dioctahedrals (montmorillonite, beidellite and nontronite) and the trioctahedral (saponite and hectorite). The most abundant smectite clay material is montmorillonite. Montmorillonite is the predominant mineral found in bentonite and fuller's earth.

Synthetic layered silicate clays also possess adsorptive properties toward alkylthioalkylamines. These materials closely resemble natural smectite clay materials. For instance, Laponite, a synthetic clay commercially available from Southern Clay Products, is a sodium lithium magnesium silicate which resembles hectorite clay both in structure and composition. It is a layered hydrous magnesium silicate which is free of the impurities found in natural clay materials.

The swelling type clays of the present invention are effective detoxifying agents at treatment ranges from about 1 to greater than 150 mg swelling type clay material to every one mg per liter of alkylthioalkylamines.

The ability of swelling types of smectite clays and synthetic layered clays to neutralize the toxicity of a variety of alkylthioalkylamine compounds to aquatic organisms was demonstrated in several aquatic acute bioassays. Static acute bioassays were conducted in accordance with U.S. E.P.A. testing guidelines. The 48 hour acute bioassays were performed using *Daphnia magna* as a representative test specie. *Daphnia magna* are extremely sensitive to alkylthioalkylamines in comparison to other aquatic organisms. The following examples summarize the results.

EXAMPLES

The bioassay procedure was as follows: *Daphnia magna* neonates (less than 24 hours old) were exposed to 1.0 mg per liter of decylthioethylamine (DTEA) combined with various concentrations of natural swelling type and non-swelling type clays as well as synthetic layered swelling clays ranging from 10 to 500 mg per liter. All test solutions were prepared in dechlorinated drinking water as the diluent. Twenty *Daphnia magna* neonates, 10 individuals per replicated test beaker, were exposed to each test solution for 48 hours under static conditions. The toxicity tests were conducted in 250 ml glass beakers containing approximately 200 ml of test solution. The toxicity tests were performed at 20°+/−1 ° C. and the test organisms were not fed during this period. Mortality observations were recorded at 24 hour intervals through the toxicity tests. Tables I and II summarize the results for swelling type clays. Tables III and IV summarize the results of comparative tests with non-swelling kaolin and attapulgite clays.

TABLE I

Montmorillonite Clay:DTEA Towards *Daphnia magna*

| DTEA Concentration (mg/L) | Clay Concentration (mg/L) | Treatment Ratio DTEA:Clay | Cumulative % Mortality |
|---|---|---|---|
| 1.0 | 0 | 1:0 | 100 |
| 1.0 | 10 | 1:10 | 100 |
| 1.0 | 20 | 1:20 | 100 |
| 1.0 | 40 | 1:40 | 5 |
| 1.0 | 80 | 1:80 | 0 |
| 1.0 | 160 | 1:160 | 0 |
| 0 | 0 | 0:0 | 0 |

TABLE II

Synthetic Layered Silicate Clay (Laponite RD):DTEA Towards *Daphnia magna*

| DTEA Concentration (mg/L) | Clay Concentration (mg/L) | Treatment Ratio DTEA:Clay | Cumulative % Mortality |
|---|---|---|---|
| 1.0 | 0 | 1.0:0 | 100 |
| 1.0 | 15 | 1:15 | 85 |
| 1.0 | 30 | 1:30 | 75 |
| 1.0 | 60 | 1:60 | 0 |
| 1.0 | 125 | 1:125 | 0 |
| 0 | 0 | 0:0 | 0 |

TABLE III

Kaolin Clay:DTEA Towards *Daphnia magna*

| DTEA Concentration (mg/L) | Clay Concentration (mg/L) | Treatment Ratio DTEA:Clay | Cumulative % Mortality |
|---|---|---|---|
| 1.0 | 0 | 1.0:0 | 100 |
| 1.0 | 30 | 1:30 | 100 |
| 1.0 | 60 | 1:60 | 100 |
| 1.0 | 125 | 1:125 | 100 |
| 1.0 | 250 | 1:250 | 100 |
| 1.0 | 500 | 1:500 | 100 |
| 0 | 0 | 0:0 | 0 |

TABLE IV

Attapulgite Clay:DTEA Towards *Daphnia magna*

| DTEA Concentration (mg/L) | Clay Concentration (mg/L) | Treatment Ratio DTEA:Clay | Cumulative % Mortality |
|---|---|---|---|
| 1.0 | 0 | 1.0:0 | 100 |
| 1.0 | 31.25 | 1:30 | 100 |
| 1.0 | 62.5 | 1:60 | 100 |
| 1.0 | 125 | 1:125 | 100 |
| 1.0 | 250 | 1:250 | 100 |
| 1.0 | 500 | 1:500 | 100 |
| 0 | 0 | 0:0 | 0 |

While the present invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method of detoxifying water containing alkylthioalkylamines toxic to aquatic organisms comprising adding thereto at least a neutralizing amount of a swelling type natural or synthetic clay, wherein said swelling type natural or synthetic clay is added to said water in a ratio of swelling type natural or synthetic clay to alkylthioalkylamine of from about 60 to 1 to about 160 to 1.

2. The method of claim 1 wherein said swelling type natural or synthetic clay is selected from the group consisting of montmorillonite, beidellite, nontronite, saponite, hectorite and layered hydrous magnesium silicate.

3. A process for significantly decreasing the toxic effects of alkylthioalkylamines towards aquatic organisms in aqueous solutions comprising adding thereto a sufficient quantity for the purpose of a swelling type natural or synthetic clay, wherein said swelling type natural or synthetic clay is added to said aqueous solution in a ratio of swelling type natural or synthetic clay to alkylthioalkylamine of from about 60 to 1 to about 160 to 1.

4. The process of claim 3 wherein said swelling type natural or synthetic clay is selected from the group consisting of montmorillonite, beidellite, nontronite, saponite, hectorite and layered hydrous magnesium silicate.

* * * * *